June 24, 1958  W. A. HELSTEN  2,840,191
CLASP BRAKE
Filed Oct. 4, 1955
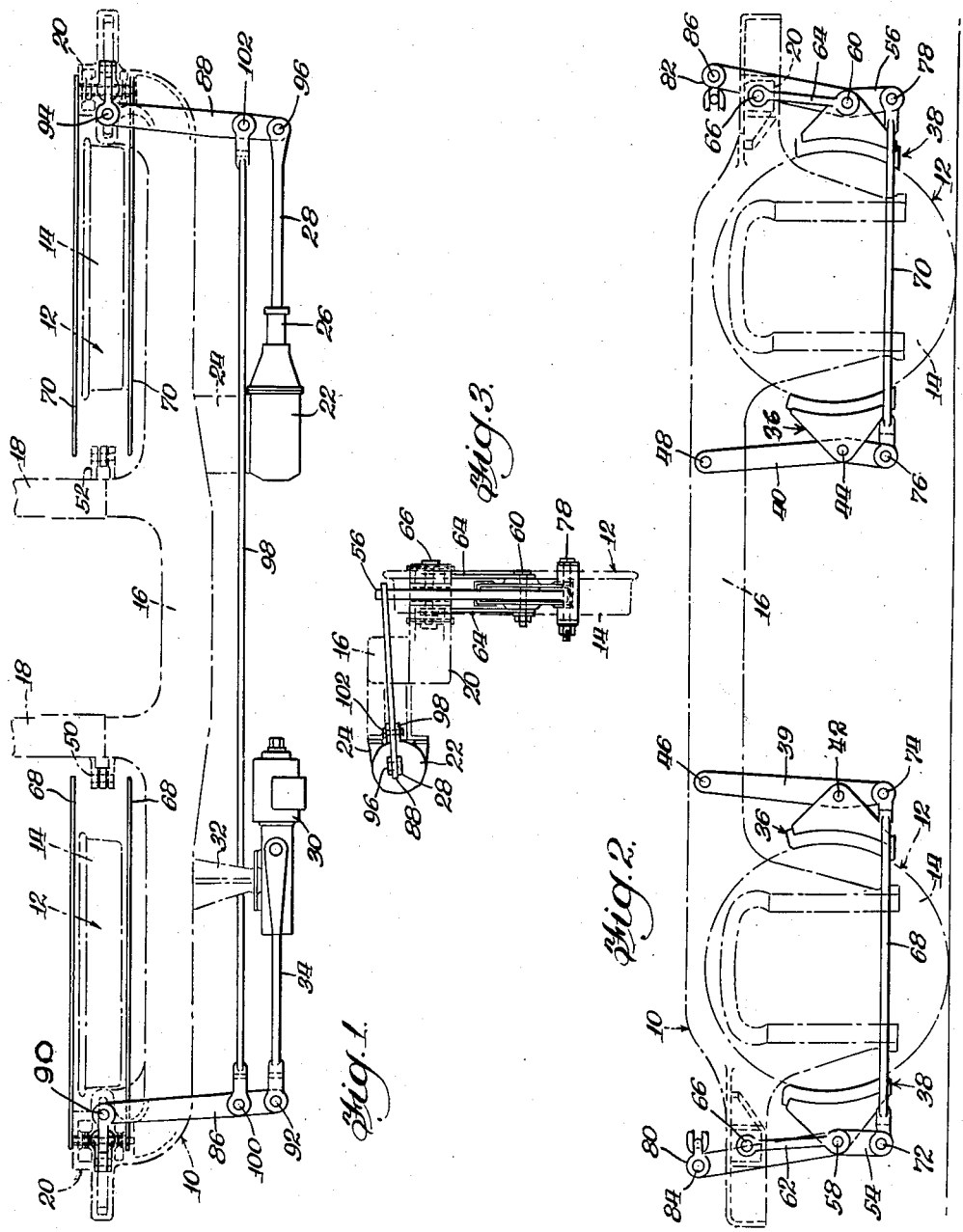
INVENTOR.
Wesley A. Helsten
BY Walter S. Schlegel, Jr.
Atty.

United States Patent Office 2,840,191
Patented June 24, 1958

2,840,191

CLASP BRAKE

Wesley A. Helsten, Chicago, Ill., assignor to American Steel Foundries, Chicago, Ill., a corporation of New Jersey Application October 4, 1955, Serial No. 538,372

2 Claims. (Cl. 188—33)

This invention relates to brake arrangements and more particularly to a brake arrangement for a railway car truck. The invention comprehends a novel brake linkage arrangement for a railway car truck wherein the truck frame is subjected to a minimum amount of operational stresses.

In conventional railway car truck brake linkage arrangements, many brake elements are fulcrumed directly to the truck frame. This is not always desirable and, in fact, is quite undesirable in the case of light weight high speed passenger car trucks in which the frame is subjected to heavy operational stresses at all of the fulcrum points. Although it is impossible to eliminate braking stresses from any linkage, it is possible and highly desirable to relieve the frame itself of the most severe stresses. It is far less expensive to replace a brake lever or a connecting rod than it is to repair or replace an entire truck frame.

It is therefore a primary object of this invention to provide a novel brake linkage arrangement for a railway car truck wherein the greatest portion of the operational stresses is distributed throughout the linkage rather than directly applied to the truck frame at specific points.

Another object of the invention is the provision of a brake arrangement wherein the majority of the levers are floating levers, not fulcrumed directly to the frame, and wherein the actuating levers are live levers interconnected by a pull rod which extends substantially the length of the truck frame.

Another object of the invention is to provide a brake linkage wherein live actuating levers are interconnected by a pull rod pivoted to the levers intermediate their respective ends.

These and other objects of the invention will be apparent from an examination of the drawings and description, wherein:

Figure 1 is a fragmentary plan view of a railway car truck embodying the invention, only one side of the truck being shown as the arrangement on the opposite side may be similar;

Figure 2 is a fragmentary elevational view of the structure illustrated in Figure 1, and Figure 3 is a fragmentary end elevational view of the structure illustrated in Figure 1, as seen from the right.

It will be noted that certain elements have been intentionally omitted from certain views where illustrated to better advantage in other views.

Referring now to the drawings for a better understanding of the invention, it will be seen that the truck, as seen in Figure 1, comprises a frame indicated generally at 10 which may be conventionally supported (not shown) by a pair of spaced wheel and axle assemblies 12, each having a wheel 14.

The frame may comprise a pair of spaced side frames 16 (only one of which is shown) interconnected by transoms 18 and end rails 20.

Referring still to Figure 1 of the drawings, it will be seen that in the embodiment illustrated a power cylinder 22 is mounted to the side frame 16 by means of a mounting bracket 24. The power cylinder preferably comprises a piston 26 having a rod 28 extending outwardly therefrom.

Also positioned on the side frame 16, and spaced from the power cylinder 22, is a slack adjusting device 30 secured to the frame 16 by a mounting bracket 32 and having an extension rod 34 extending outwardly therefrom.

Each wheel 14 may be provided with a pair of inner and outer brake shoe assemblies 36 and 38, respectively, positioned adjacent thereto and engageable therewith.

Inner brake shoe assemblies 36, as best seen in Figure 2 of the drawings, are supported from the side frame by left and right inner dead brake levers 39 and 40, respectively. The levers are pivoted intermediate their respective ends to the brake shoe assemblies by pins 42 and 44 and have their upper ends pivoted by pins 46 and 48 to transom brackets 50 and 52, respectively.

Outer brake shoe assemblies 38 are pivoted to left and right outer brake levers 54 and 56 intermediate the ends of the levers by pins 58 and 60, respectively. The outer brake shoe assemblies are supported from the frame by left and right outer hangers 62 and 64 which have their upper ends pivoted to the frame at 66 and which are pivoted to the brake shoe assemblies by the common pivotal pins 58 and 60, respectively.

The lower ends of inner and outer brake levers associated with the wheels may be interconnected by pull rods 68 and 70, as seen in Figure 2, pull rod 68 is connected to the left outer and inner levers by pins 72 and 74, respectively, and pull rod 70 is connected to the right inner and outer brake levers by pins 76 and 78, respectively. The upper ends of outer brake levers 54 and 56 are preferably connected to clevises 80 and 82, respectively, by pins 84 and 86.

Referring again to Figure 1, it will be seen that a pair of live and dead actuating levers 86 and 88, respectively, are disposed adjacent opposite ends of the frame. Left actuating lever 86 has its inboard end pivoted by pin 90 to clevis 80 and its outboard end pivoted by pin 92 to slack adjusting extension rod 34. Right hand actuating lever 88 is pivoted by pin 94 at its inboard end to clevis 82 and at its outboard end by pin 96 to power cylinder extension rod 28.

The actuating levers are interconnected intermediate their ends by tension rod 98 which is pivoted to the respective levers by pins 100 and 102. It will be noted that the tension rod is disposed in a generally horizontal plane which is substantially parallel to the longitudinal vertical central plane of the truck, and also that the rod extends almost the entire length of the truck frame.

To describe the operation of the arrangement, it will be understood that as the power cylinder is actuated, the rod 28 moves to the right carrying with it the outboard end of right hand actuating lever 88 causing the actuating lever to rotate counterclockwise about pin 102, as best seen in Figure 1. As the inboard end of lever 88 moves to the left, it urges right hand outer brake lever 56 to pivot counterclockwise about pin 78 to carry outer brake shoe assembly 38 into engagement with the right wheel. As the outer brake shoe assembly engages the wheel, the pivot point of brake lever 56 shifts from pin 78 to pin 60 and the lever continues to pivot counterclockwise thereby moving pull rod 70 to the right and inner brake shoe assembly 36 is carried into engagement with the wheel.

At this time, the pivotal point of actuating lever 88 shifts from pin 102 to pin 94 and the lever continues to rotate counterclockwise urging tension rod 98 to the right, as seen in Figure 1. As tension rod 98 moves to the right, it urges left hand actuating lever 86 to rotate clockwise about pin 92 thereby causing outer brake lever 54 to rotate clockwise about pin 72 and carry outer brake shoe assembly 38 into engagement with the left wheel. As the brake shoe assembly engages the wheel, the pivot point of lever 54 shifts from pin 72 to pin 58 and the lever continues to rotate clockwise moving pull rod 68 to the left and inner brake shoe assembly is carried into engagement with the wheel. It is to be understood, of course, that all of this braking action occurs almost simultaneously.

It will be noted that only inner brake levers 39 and 40 are dead levers fulcrumed to the frame, whereas the outer or operating brake levers, as well as actuating lever 88 interconnecting one of the outer brake levers with the power means are all live levers, none of which are fulcrumed to the frame. Actuating lever 86 interconnects the other of the outer brake levers to the slack adjusting means thus providing a dead lever which is not fulcrumed to the frame. It has been discovered that the stresses caused by the fulcruming of the actuating levers to the frame can be eliminated by providing a live and a dead actuating lever which are interconnected intermediate their respective ends by a tension rod extending substantially the length of the truck.

I claim:
1. A brake arrangement for a railway car truck having a truck frame supported by spaced wheel and axle assemblies, an intermediate portion of said frame comprising a surface disposed at a level above the surfaces of the opposite ends of said frame, a pair of actuating levers disposed at said opposite ends, said levers being disposed above the surfaces of said ends and below the surface of said intermediate portion, power means and slack adjusting means, respectively, operably connected to the outboard ends of said pair of actuating levers, a tension rod connecting said actuating levers, said tension rod being disposed outboardly of said frame and below the surface of said intermediate portion, and brake means operably connected to the inboard ends of said actuating levers.

2. A brake arrangement according to claim 1, wherein said tension rod connects said actuating levers adjacent the outboard ends thereof, and said rod extends substantially the entire length of said truck.

References Cited in the file of this patent
UNITED STATES PATENTS

| | | |
|---|---|---|
| 1,807,575 | Mussey | May 26, 1931 |
| 2,084,073 | Baselt | June 15, 1937 |